E. W. COMFORT.
THERMOSTAT.
APPLICATION FILED JUNE 11, 1904.
912,287.
Patented Feb. 16, 1909.
2 SHEETS—SHEET 1.
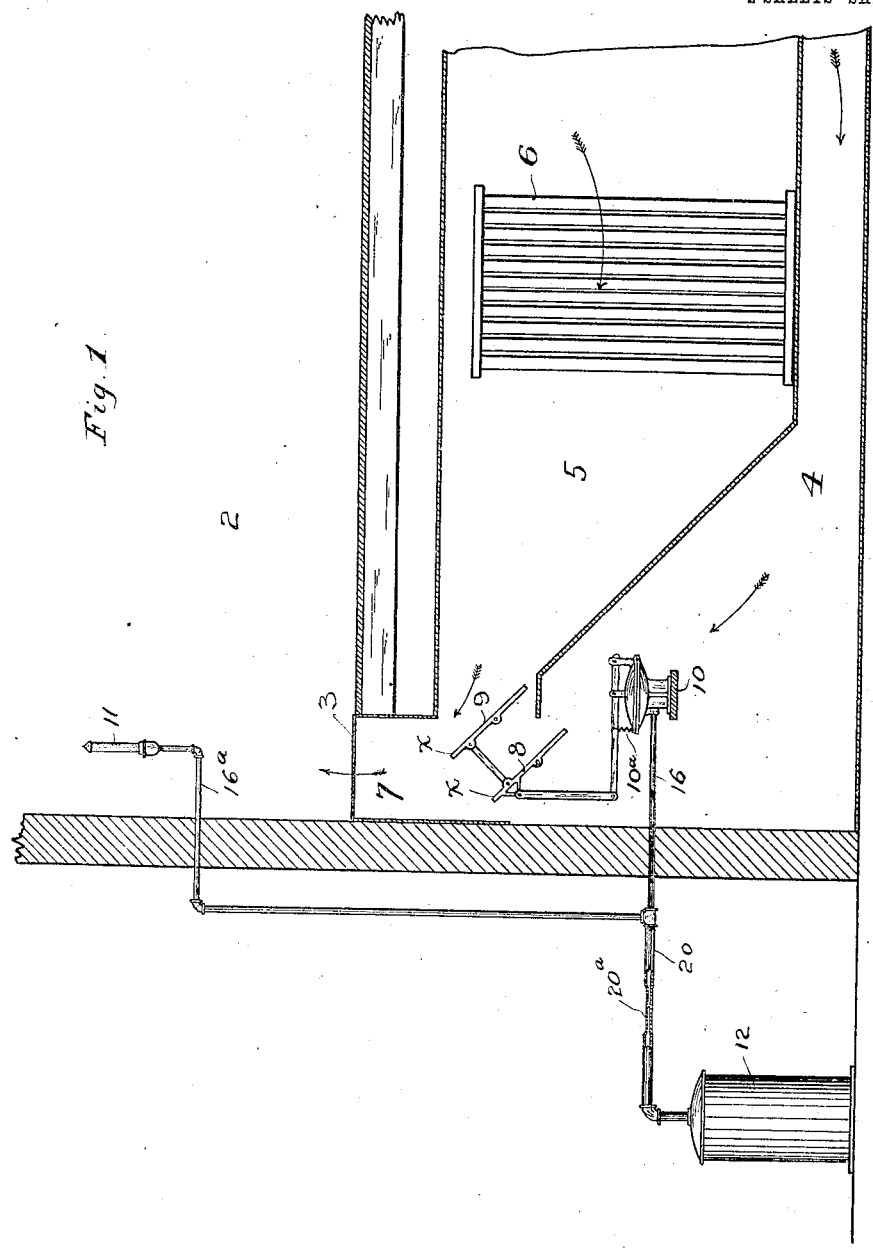

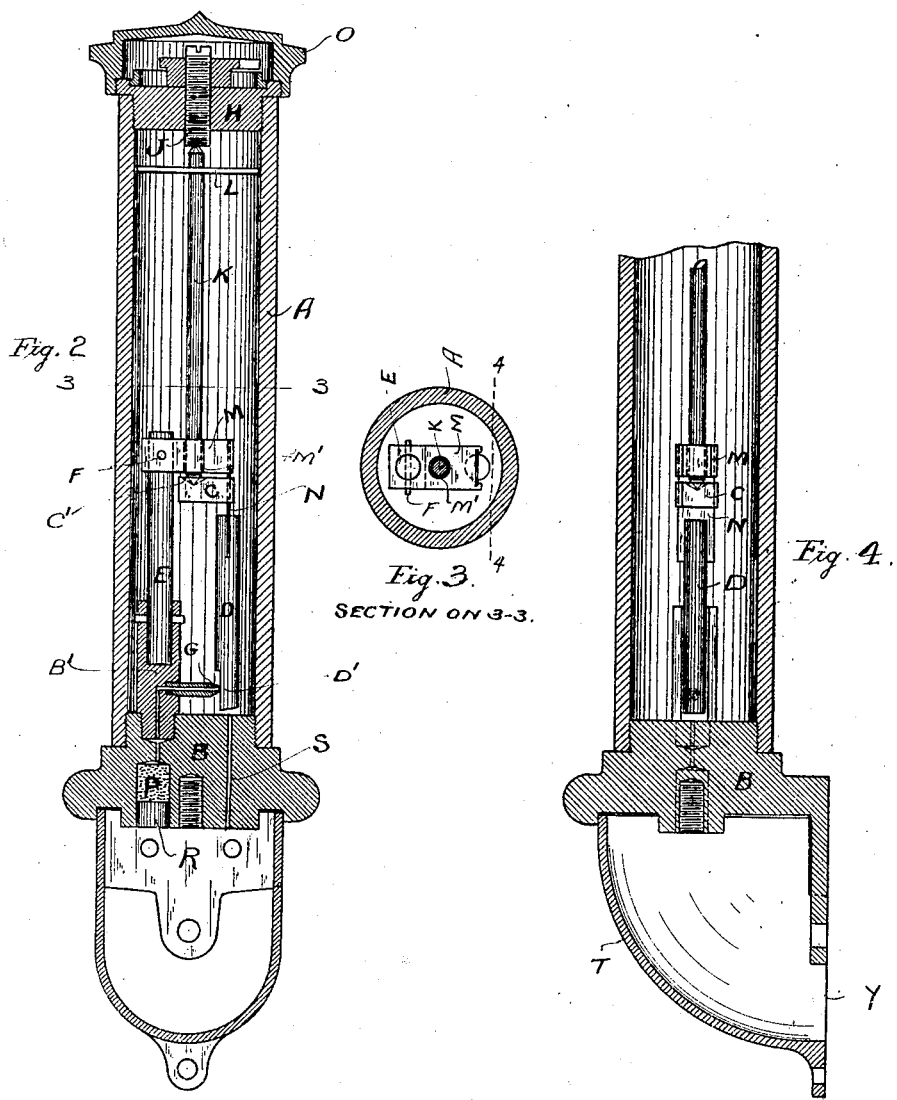

UNITED STATES PATENT OFFICE.

EDWARD W. COMFORT, OF CHICAGO, ILLINOIS, ASSIGNOR TO NATIONAL REGULATOR COMPANY, OF CHICAGO, ILLINOIS, A CORPORATION.

THERMOSTAT.

No. 912,287.　　　Specification of Letters Patent.　　　Patented Feb. 16, 1909.

Application filed June 11, 1904. Serial No. 212,122.

*To all whom it may concern:*

Be it known that I, EDWARD W. COMFORT, a citizen of the United States, residing at Chicago, in the county of Cook and State of Illinois, have invented new and useful Improvements in Thermostats, of which the following is a full, clear, concise, and exact description, reference being had to the accompanying drawing, forming a part of this specification.

My invention relates to apparatus for automatically controlling the temperature in buildings and other places.

The best results in controlling the temperature in apartments have been obtained through the medium of a mixture of hot and cold air admitted to the same and to attain such results it has been the general custom to arrange passages or ducts leading to the apartment, through which the hot and cold air is admitted for controlling the temperature of the same, and to control the admission of air by dampers arranged in the passages or ducts. These dampers are preferably controlled by motors operated by fluid under pressure supplied from a suitable source, and for controlling the fluid under pressure a valve is generally provided, which regulates the fluid under pressure admitted to the motors. A thermostatic element arranged in the apartment is provided for controlling the valve. It has been found that the best results for controlling the temperature are obtained by gradually varying the relative proportions of hot and cold air admitted to the apartment, as a sudden change in the proportions of the mixture of hot and cold air, or only admitting one or the other at a time, produces too rapid a change in the temperature and does not effect uniform regulation.

It is therefore the object of the present invention to provide a thermostatic element which will control the motor and cause the same to gradually change the position of the dampers under the variations of temperature.

In the accompanying drawings illustrating the preferred embodiment of my invention, Figure 1 is a diagrammatic view showing the dampers and means for operating the same; Fig. 2 is a longitudinal section of the thermostatic device embodying my invention; Fig. 3 is a sectional view on the line 3—3 of Fig. 2; and Fig. 4 is a partial section taken on the line 4—4 of Fig. 3.

In my preferred arrangement, as shown in Fig. 1, the room 2 to be heated is provided with the register or opening 3, which communicates, by means of a duct 7 for the admission of hot and cold air into the room, with the cold air room or passage 4, and with the room 5, which is heated by the steam coil 6. The air in the duct 7 is mixed in desired proportions of hot and cold air by the dampers 8 and 9, suitably connected together, so that as one closes, the other is opened and operated by the pressure motor 10, which is controlled by the thermostatic device 11 placed in the room 2, a source of fluid under pressure 12 being also connected with said device to furnish power for the operation of the motor 10.

As will be apparent from an inspection of the figures, it is not desirable, in ordinary temperature regulation, to entirely close either the hot or cold air duct, for this would throw the hot or cold air alone into the room. An intermediate position of the dampers, so as to suitably temper the air introduced into the room, is, therefore, ordinarily desired, and it is for this method of working that my invention is especially advantageous.

In Figs. 2 to 4 is shown my thermostatic element, in which a tube A, preferably of hard rubber, but of any material responsive to temperature changes, is provided. A plug B is screwed into the lower end of the tube and is provided with a port S leading to the open air. A second port G is formed in the side of a projection B' formed on the base of the plug B, said port connecting with the opening R, to which is connected the pipe 16ª, leading from the supply tank 12, a suitable filter P being provided in the opening or port R. A casing T is preferably formed on the lower end of the plug B, this casing having an opening Y, through which the pipe 16ª extends to be connected with the port R. Extending from the upper end of the projection B', and preferably supported thereby, is a support E, to which is secured a block M. In securing said block in position the same is preferably formed with an opening therein, through which the upper end of the support E passes, and a pin F is then preferably driven transversely through the support E, and the block M. thereby securely holding the block in position. Depending from the opposite end of said block is preferably a flat spring N, to the lower end of which is secured the arm D, forming at its lower end a valve D' for the port or opening G. Secured to the spring N, at a point intermediate between the block M and the valve arm D, is an inwardly projecting block C, which has a seat C' preferably formed therein, immediately below an opening M' in the block M. Upon the top of said block C bears the lower end of a pin or rod K, which is preferably pointed and passes through the opening M', having its end seated in the recess C'. Upon the upper end of said pin bears the point of a screw J, which passes through a plug H, preferably threaded into the upper end of the tube A. In assembling the parts of the thermostat, the pin or rod K, after being set upon the block C, is held in a central position by a disk, L, which engages the inner walls of the tube until the screw is brought to bear upon the top of said pin. By turning the screw J, the position of the valve, relative to its seat, may be adjusted. After the screw has been set, it is preferably covered by a cap or casing O, threaded upon the plug H, to give the thermostat a finished appearance and to protect the screw J.

As shown in Fig. 1, the source of supply 12 is connected directly with the motor 10, by means of pipes 20 and 16. From an intermediate point of said connection the single pipe 16ª leads to the thermostat 11, which, as before described, is placed in the room 2, the temperature of which is to be controlled. In the pipe 20, between the branch leading to the thermostat, and the source of supply, a restricted passage 20ª is provided, said passage, as shown, consisting merely in a reduction in diameter of the pipe 20, but it is apparent that any other means for producing the restricted passage may be employed, as, for instance, an adjustable valve. With this arrangement the pipe 16ª is connected directly with the interior of the thermostatic tube A, as, for instance, with the port R, while the other opening S, is an outlet and opens directly to the atmosphere.

In operation, I will refer to the pressure of the fluid from the tank as the supply pressure and to this pressure at the port, reduced by what has escaped through the valve, as the effective pressure. It will be noted that there is a constant fluid pressure in the tank and when the valve D' is open, there is a constant flow of air through the restricted passage 20ª to the thermostat and through the port S to the atmosphere. The normal position of the valve D is closed, being held in that position by the tension of the spring N, unless some means are provided to aid the pressure at the port G to flex the spring and blow the valve open; the tension of this spring being such that it requires more than the full tank pressure to open the valve. The consequence of this is that if it were not for the pressure of the thermostatic element transmitted through the rod K, the thermostatic valve or the valve D' would remain permanently closed and the full pressure would always be exerted upon the diaphragm of the motor 10. The contraction of the thermostatic element under the influence of a low temperature produces a pressure on the block C which neutralizes a part of the tension of the spring N and thus permits the fluid under pressure in the port to blow the valve open. This opening of the valve and release of the fluid under pressure reduces the pressure acting to blow the valve open and the same closes again until the supply through the restricted opening in the pipe restores pressure to a degree sufficient to again open the valve. It will be noted from the above that there are only two forces acting, namely, the fluid pressure tending to blow the valve open and the spring pressure tending to hold the valve closed, the latter being modified by the thermostatic element.

For the purpose of illustration, it will be assumed, for instance, that the temperature of the apartment in which the thermostat is placed, is 69° Fahrenheit. Under this condition, the thermostatic tube will assume a definite length, and for this length of the tube the parts will assume a position wherein the valve, by remaining slightly open, or by repeatedly opening and closing in rapid succession, will permit the escape of fluid from the storage chamber 12 at a rate equal to the rate at which it is supplied through the restricted passage 20ª, thereby preventing air passing either to or from the motor 10, and thus maintaining a constant pressure in the motor. In this position, the effective fluid pressure (that is, the pressure at the port G) and the spring pressure are nicely balanced, the valve vibrating slightly as one or the other predominates, maintaining a constant pressure in the motor to thus hold the valve or damper controlled by the motor in a definite position so long as the temperature in the apartment remains at the assumed temperature of 69° Fahrenheit. Assuming now, that the temperature increases to, say, 70°, the thermostatic tube will expand gradually, thereby relieving somewhat the pressure on the block C and permitting the spring N to act with greater force and move the valve toward its seat. This prevents the fluid escaping as rapidly as it passes through the restricted passage 20ª, and the pressure in the motor will be increased, causing the latter to operate to close the hot air damper 9 and open the cold air damper 8. The pressure at the port G will, however, oppose the tension of the spring to such an extent that the spring pressure and the effective pressure will again balance. This nice balancing of the spring pressure and the fluid pressure maintains the pressure in the motor practically constant, and the damper or valve thus remains in a definite position so long as the temperature remains at the assumed 70°. This balancing effect of the effective pressure and the spring pressure may result in the valve remaining partially open, or it may result in a repeated opening and closing of the valve in quick succession, but in either case the pressure at the motor will be maintained practically constant for a given temperature. Likewise, when the temperature falls again to, say, 69°, the thermostatic tube, contracting, decreases the pressure of the valve D on the port G, which allows the fluid to again readily escape through the port G, thereby permitting a greater amount of fluid to escape to the atmosphere through the pipe 16$^a$ and 16, than will pass through the restriction 20$^a$ in the supply pipe 20, until the spring and the effective fluid pressures again balance, when the decreased pressure in the motor will be maintained constant to hold the damper in a new definite position so long as the temperature remains constant. It will thus be noted that the heat responsive element of the thermostat serves to vary the tension of the spring N and therefore to modify the force with which it presses the valve against its seat, so that the valve, instead of following the precise movement of the thermostatic element, partakes of a retarded movement, due to the tension of the balancing spring, which prevents the valve from moving in a direction to open or close the port as rapidly as would be the case were the valve connected directly and unyieldingly to the thermostatic element.

In previous patents granted to me I have shown devices for a similar purpose, as above, but these thermostats have worked on the principle of a pressure reducing valve thermostatically adjusted. The present device, it will be noted, on the contrary, is a safety valve thermostatically adjusted. The thermostatic element sets the safety valve so that it may be opened at any desired pressure up to the full pressure of the fluid supply.

For the purpose of illustration, I have shown my thermostat as applied to one system of apparatus for controlling the temperature of apartments, but it is apparent that it is applicable to other systems and I do not wish to limit myself to the particular form shown in the present application, as the same may be used for controlling valves and for various other purposes, which it has been thought unnecessary to illustrate.

I have shown in the drawings the thermostatic element as being a tube in which the valve and other operative parts are inclosed, but it will be understood that I do not wish to limit myself to this specific form of thermostatic element as any other thermostat may be provided for producing the same result and it is not necessary that the operative parts should be inclosed, as shown, but the same may be left entirely open and subjected to the influences of any thermostatic element, which it may be desirable to use.

When speaking of "a valve" in the claims, I contemplate not only a single valve, but also any valve combination or valve mechanism capable of accomplishing substantially similar results.

Having described my invention what I claim as new and desire to secure by Letters Patent is:

1. The combination with means for conveying a fluid under pressure, of a valve for governing the flow of said fluid, said valve closing in a direction opposite to that of the flow of the fluid and being under the influence of the pressure of said fluid passing through said valve, and yieldable means tending to hold said valve closed, the tension of said yieldable means being under thermostatic control, to vary the force exerted thereby.

2. The combination with a thermostat constituting a hollow chamber, of a fluid supply, a motor operated by fluid from said supply, a valve for governing the flow of the fluid, said valve closing in a direction opposite to that of the flow of the fluid and being under the influence of the pressure of said fluid, and yieldable means within said chamber tending to hold said valve closed, the tension of said yieldable means being under the control of, and varied by, said thermostat.

3. In combination, a source of fluid pressure, a motor actuated by the fluid, an inlet pipe extending directly between said fluid supply and said motor, a thermostat, a pipe extending from said motor to said thermostat, a valve controlling the pressure to which the motor is subjected, said valve closing in a direction opposite to that of the flow of the fluid and being under the influence of the pressure of said fluid, said valve controlling the escape from the motor, yieldable means tending to hold said valve closed, the tension of said yieldable means being under the control of said thermostat, said inlet pipe having at one point a restriction which is of less area than the exit controlled by the valve.

4. In combination, a source of fluid pressure, a motor actuated by the fluid, an inlet pipe extending directly between said fluid supply and said motor, a thermostat, a pipe extending from said motor to said thermostat, a valve controlling the pressure to which the motor is subjected and being under the influence of the pressure of said fluid, said valve controlling the escape from the motor, yieldable means tending to hold said valve closed, the tension of said yieldable means being under the control of said thermostat, said inlet pipe having at one point a restriction which is of less area than the exit controlled by the valve.

5. The combination of a source of supply of fluid under pressure, a motor having a vent, means for conducting fluid from said source to said motor, means for limiting the flow through said conducting means, and means for controlling the escape of fluid from said vent, said means comprising a valve tending to close said vent against the flow therefrom, and a thermostatic element arranged to gradually vary the force with which said valve acts to close said vent.

6. The combination with a thermostatic tube, of a longitudinally arranged support therein, a transverse member projecting from said support, a valve operating member a spring supporting said valve operating member and secured to said transverse member, a third member to affect the tension of said spring extending transversely toward the center of the tube, and a fourth member extending from the third member to the opposite end of said thermostatic tube, substantially as described.

7. The combination with a source of fluid supply, of a motor provided with a vent, means for conducting fluid from said source to said motor, said means being arranged to limit the flow therethrough, and means for controlling the escape of fluid from said vent and thereby varying the relation between the flow through said conducting means and the flow from said vent, said means comprising a valve, a spring tending to close said valve against the flow from the vent, and a thermostatic element arranged to vary the power of said spring.

8. The combination of a source of fluid supply, a motor, means for conducting fluid from said source to said motor, and means for varying the pressure in said motor, said means comprising a thermostatic element having a chamber therein communicating with the atmosphere and having a port communicating with said motor, a valve in said chamber, and an energy storage device tending to close said valve against the flow of fluid from said port, the power exerted by said energy storage device being varied by the expansion and contraction of said thermostatic element.

In witness whereof, I have hereunto subscribed by name in the presence of two witnesses.

EDWARD W. COMFORT.

Witnesses:
W. PERRY HAHN,
E. R. KING.